March 14, 1961 K. G. KING ET AL 2,975,273
INTERMITTENT INDUCTIVE TRAIN CONTROL SYSTEMS
Filed March 22, 1957 8 Sheets-Sheet 1
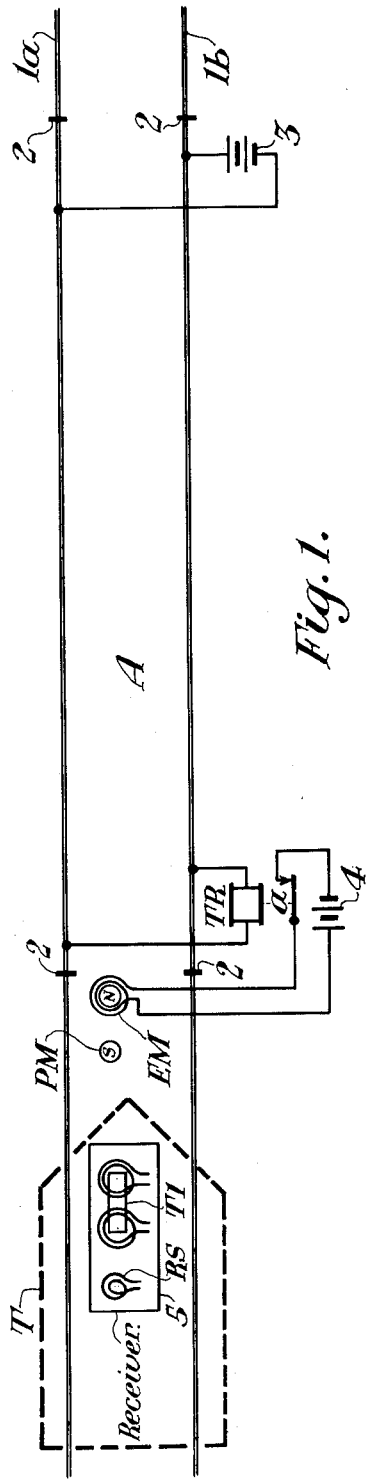
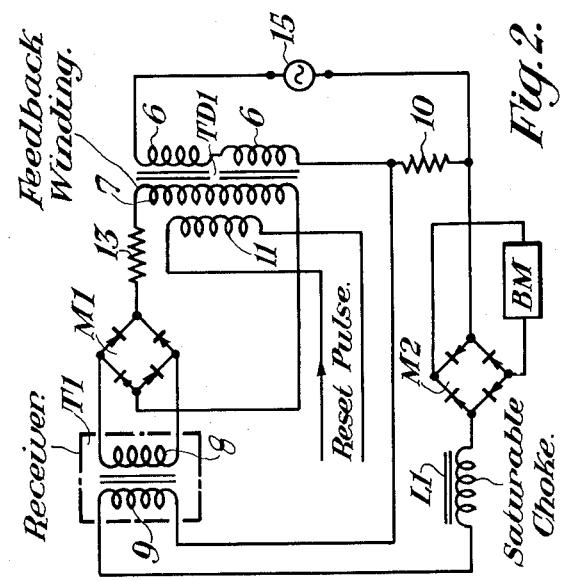
INVENTORS
Kenneth Gordon King and
Arnold William Tucker.
BY
W. L. Stout
THEIR ATTORNEY March 14, 1961 K. G. KING ET AL 2,975,273
INTERMITTENT INDUCTIVE TRAIN CONTROL SYSTEMS
Filed March 22, 1957 8 Sheets-Sheet 4

INVENTORS
Kenneth Gordon King and
Arnold William Tucker.
BY W. L. Stout
THEIR ATTORNEY United States Patent Office 2,975,273
Patented Mar. 14, 1961

2,975,273

INTERMITTENT INDUCTIVE TRAIN CONTROL SYSTEMS

Kenneth G. King and Arnold William Tucker, London, England, assignors to Westinghouse Brake and Signal Company, Limited, London, England Filed Mar. 22, 1957, Ser. No. 648,463

Claims priority, application Great Britain Apr. 4, 1956

11 Claims. (Cl. 246—63)

This invention relates to an intermittent inductive train control system and more particularly to a train control system of the kind adapted to give a warning to the operator of a train that a signal is being approached, together with an indication as to whether the signal is displaying a "clear" aspect or a "caution" aspect and, if the signal is displaying the latter aspect, to initiate an automatic application of the train brakes unless the operator takes some action to acknowledge the warning within a predetermined time interval.

In one such system, a permanent magnet and an electromagnet are mounted, in line, within the trackway and located in advance of the signal so that a train approaching the signal approaches the permanent magnet before the electromagnet. The electromagnet is energized when the signal is displaying a "clear" aspect and is deenergized when the signal is displaying a "caution" aspect. Each of the magnets is mounted substantially vertical, the permanent magnet having its "south" pole uppermost and the electromagnet, when energized, having its "north" pole uppermost.

The apparatus carried by the train comprises a two-position relay operated receiver. As the receiver passes over the magnets, the relay is energized or deenergized depending upon the polarity of the magnetic flux through which it passes. This relay completes or opens energizing circuits for other relays which, in turn, control the energization of a magnet valve for operating the train's brakes and certain indicating and warning devices. The magnet valve is normally energized and, when permitted to assume its released position, causes an application of the vehicle's brakes. The indicating device displays an indication as to the aspect displayed by the last signal passed. Warning devices comprising a bell which rings for a brief period when the signal displays a "clear" aspect, and a horn, which sounds when the signal displays a "caution" aspect, are provided as a part of the train carried apparatus.

Systems of this kind have the disadvantage that they incorporate certain relays, as mentioned above, with their moving parts which are a potential source of failure due to wear, vibration and mechanical shock and which require skilled maintenance to keep them in satisfactory condition.

It is an object of this invention to provide train carried apparatus for an automatic train control system of the kind described in which the number of moving parts is reduced to a minimum.

A further object of this invention is to provide train carried apparatus for an automatic train control system of the kind described but which is inherently safe against the failure of component parts therein.

In carrying out our invention, we make use of a modification of a transductor trigger circuit shown and described in our copending United States patent application Serial No. 591,047, now U.S. Patent No. 2,908,857, granted Oct. 13, 1959. The transductor trigger circuit comprises a saturable reactor having an alternating current winding and control windings. The alternating current winding is connected in series with a load to a source of alternating current energy. Means is provided for connecting one of the control windings to the load to form a feedback circuit. A non-linear choke or saturable reactor is connected in the feedback circuit in a manner to provide a low impedance when the load current is high and to provide a high impedance when the load current is low. A feedback circuit is thereby established in which a variable degree of self excitation or feedback is provided. When the current flowing in the alternating current winding is small, the choke restricts the amount of self excitation to a value such that the excitation has little or no effect, but when the current is large the self excitation is increased sufficiently to sustain the large current. The transductor trigger circuit is thereby a bi-stable device in which either one of two different values of load current may be sustained. To switch the device from one value of load current to the alternate value it is only necessary to apply a pulse of current of the correct polarity to either a second control winding or to the feedback winding.

In our present invention a brake valve for controlling the brakes on a train is controlled by the transductor trigger circuit. The feedback circuit includes a flux detector which is responsive to the flux of the magnets located in the trackway and provides means for switching the trigger circuit from one stable state to the alternate. The brake valve is energized or deenergized in accordance with the state of the transductor circuit.

The transductor trigger circuit is normally in a state of high current conduction which corresponds to the brake magnet being energized and the brakes released. Upon passing the permanent magnet, the state of the trigger circuit is changed to that of low current conduction which initiates an application of the train brakes. However, upon subsequently passing the electromagnet a reset coil in the receiver resets the trigger circuit to the original condition, if the electromagnet is energized, to prevent the application of the train brakes.

Other objects and characteristic features of our invention will become apparent from the following description taken in connection with the accompanying drawings.

In the accompanying drawings Fig. 1 is a diagrammatic view illustrating the physical layout of the apparatus forming the track circuit and of the train carried apparatus for sensing the flux fields produced by the magnets located within the trackway.

Fig. 2 is a schematic view illustrating the invention in simple form.

Fig. 2a is a diagrammatic view of the transductor illustrated schematically in Fig. 2.

Similar reference characters refer to similar parts in each of the several views.

Figure 3:
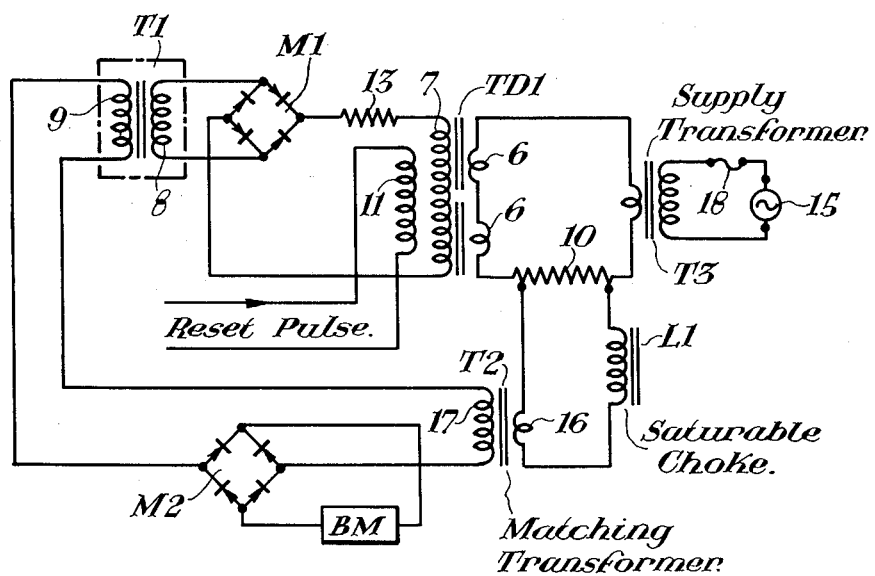
Fig. 3 is a diagrammatic view of the train carried apparatus in which certain safety precautions normally required in railway signaling systems are incorporated.

Referring now to Fig. 1, there is shown a section of railway track comprising track rails 1a and 1b. The track rails are divided by means of insulated rail joints 2 to form a plurality of track sections, of which only track section A is shown complete in the drawings. A suitable source of electrical energy, here shown as a battery 3, is connected to one end of each track section and a suitable track relay TR responsive to current from the source of energy is connected to the opposite end of each track section. Each section is thereby arranged to form a track circuit in which the associated relay is energized when the track section is unoccupied and is deenergized when the track section is occupied. The relay end of each track section is provided with a permanent magnet PM and an electromagnet EM located, in line, within the trackway and in a position such that a train traveling in the direction indicated in Fig. 1 approaches the permanent magnet before the electromagnet. The magnets are mounted in a vertical position and the "south" pole of the permanent magnet is uppermost as indicated in the drawings. An energizing circuit for the electromagnet comprises a front contact a of relay TR and a suitable source of direct current energy 4. The circuit is thereby arranged so that when the track section A is unoccupied, the electromagnet is energized. The electromagnet is positioned so that when it is energized, the "north" pole is uppermost as also indicated in the drawings.

A train T using the trackway is equipped with a receiver 5 for detecting the occupancy conditions of the track section. The receiver is equipped with a saturable transformer T1 and a reset coil RS, the purpose of which will soon be explained.

Referring now to Fig. 2, there is shown a circuit, referred to herein as the tripping circuit, comprising a transductor TD1 having an alternating current winding 6, a feedback winding 7 and a control winding 11. The control winding may constitute or form a part of the feedback winding as will be seen later. The alternating current winding 6 is connected in series with a load, here shown as a resistor 10, across a source of alternating current energy 15. The feedback circuit is connected across resistor 10 and comprises the feedback winding 7 which is connected to the output circuit of a rectifier M1, the input circuit of which is connected to a secondary winding 8 of a saturable transformer T1. A primary winding 9 of the transformer is connected through a saturable choke L1 in series with a rectifier M2 to the load resistor 10. A brake magnet BM is connected across the direct current terminals of rectifier M2 and is energized or deenergized in accordance with the magnitude of the current in the feedback circuit. The brake magnet remains in an energized position as long as the current in the feedback winding is maintained at or above a predetermined value.

When the transductor is supplying full output current, the voltage developed across resistor 10 is sufficient to cause the saturable choke L1 to be saturated and, with the transductor winding suitably chosen, the magnetic bias produced by the feedback current in the feedback winding 7 is sufficient to sustain full output current so that a stable state of equilibrium results. This state is hereinafter referred to as the "on" state. When the saturable transformer is saturated with an external flux such, for example, as the flux from a magnet in the trackway, the output voltage from the secondary winding 8 of the transformer T1 is decreased to nearly zero, and the current in winding 6 of the transductor decreases to a low value. The voltage across resistor 10 decreases and the impedance of the saturable choke L1, consequently, becomes high. When the saturating flux is removed from the saturable transformer, the increased impedance of the feedback circuit permits only a very small current to flow in the feedback winding. This current is insufficient to raise the output current of the transductor appreciably above a relatively small value, and a second condition of stable equilibrium is established, hereafter referred to as the "off" state. The condition of full output or the "on" state can be restored by the application of a pulse of current to the feedback winding having the same polarity as the current already existing in that winding or by applying a pulse of current to a separate winding such as winding 11.

It would be possible to make resistor 10 the useful load (that is the brake magnet valve, or the control winding of a further amplifier), but two advantages are secured by connecting the load in the feedback path. These advantages are:

(1) Due to variable impedance of the saturable choke the ratio of maximum to minimum current in the feedback path is greater than that in the alternating current winding of the transductor, and (2) If resistor 10 were to include a rectifier, as would be necessary if direct current output were required, any increase in the forward resistance of the rectifier due to natural aging or deterioration would increase the feedback current which would tend to bring about a spurious output from the transductor. However, with the arrangement shown, rectifier deterioration would cause a tendency toward minimum output which creates a safe condition rather than an unsafe condition.

Resistor 13 is connected directly in series with the feedback winding in order to reduce harmonics of the current which might otherwise, due to the rectification with the feedback rectifier, prevent the correct functioning of the circuit.

One suitable arrangement of the transductor TD1 is shown in Fig. 2a. As here shown the transductor comprises a magnetic core 12 having a middle leg and two outside legs. The alternating current winding 6 may be divided in half with one-half of each winding located on one outside leg of the core. The windings are connected in series with resistor 10 to the energy source 15. Feedback winding 7 and control winding 11 are both mounted on a center leg of the core in such manner that current flowing in either one or both of the windings produces a biasing flux within the magnetic core. Inasmuch as the impedance of the alternating current winding 6 depends upon the flux within the core, the impedance of this winding is controlled by the current flowing in the feedback and control windings.

As our invention is intended for use in connection with railway braking systems, it is desirable to guard against faults as might occur within the apparatus which would result in dangerous conditions. Such possible faults are:

(1) An open circuit in resistor 10;

(2) A short circuit in the winding of the saturable reactor L1 or in the alternating current winding 6 of the transductor, and (3) An increased supply voltage or reduced frequency.

A modification of Fig. 2 which will eliminate such possible conditions is illustrated in Fig. 3. Referring now to Fig. 3, the possibility of the occurrence of short circuited turns within the alternating current winding of the transductor or in the saturable choke winding is avoided, for all practical purposes, by providing the alternating current winding with only a few turns and insulating the turns with such slightly stressed insulation that a short circuited turn is a question of major mechanical damage rather than an electrical fault. The windings may be single turns of thick copper strip. The windings can thus be regarded as inherently stable.

In the case of the choke L1, it may not be possible to obtain the required impedance characteristics with a single turn, but an adequate degree of reliability is afforded by employing a winding composed, for example, of four turns of copper strip wound in the form of a spiral and interleaved with press board insulating strip. It should be noted that the possibility of insulation breakdown is virtually non-existent as a result of the very low voltages in the circuit (usually under half a volt).

It is impractical, and unnecessary, to extend this principle to the remainder of the circuit. A matching transformer T2, having a single turn primary winding 16 and having a relatively high impedance secondary winding 17, is interposed between the saturable choke and the saturable transformer T1.

To exclude the possibility of trouble due to a broken connection to resistor 10, the resistor is constructed in the form of a four terminal shunt, so that any disconnection results in an interruption of the feedback path which in turn, results in a safe condition. The risk of breakage of the resistor itself, which could provide a dangerous condition, is rendered negligible by the fact that in such a low impedance circuit the resistor may be composed of a virtually indestructible bar of resistance material.

The remaining possibility of failure, that of a dangerous increase of the magnetizing current of the transductor due to an increase in the voltage to frequency ratio of the supply source, is overcome by employing a transformer T3 connected between the source 15 and the remainder of the circuitry and having a core material with a sharp saturating characteristic. Such a transformer then acts as an inherently reliable voltage limiter and having a limiting voltage proportional to the frequency of the supply source. In cases where the supply voltage is substantially constant to within plus or minus two percent, a fuse 18 can be connected in series with the transformer primary to give protection against excessive voltage due to failure of the regulating apparatus. If the supply voltage varies over a wider range, the variations of current in the tripping circuit may be excessive (due to the characteristics of L1), and in this case it is advantageous to use a saturable transformer for the supply transformer to stabilize the voltage. However, a crude but very effective and safe voltage stabilizer may be achieved by supplying current to the primary winding through a resistor (not shown).

When it is necessary for the apparatus to function satisfactorily at relatively high speeds, such as speeds up to 120 miles per hour, the pulse of magnetic flux which saturates the transformer T1 is of short time duration, thus requiring a rapid response on the part of the transductor TD1. This in connection with the fact that only a small part of the total transductor output current is available in the form of useful output and since the saturable transformer T1 must be small enough to respond to the flux available, and therefore has a limited output, requires a further stage of amplification for operating the brake magnet.

Figure 4:
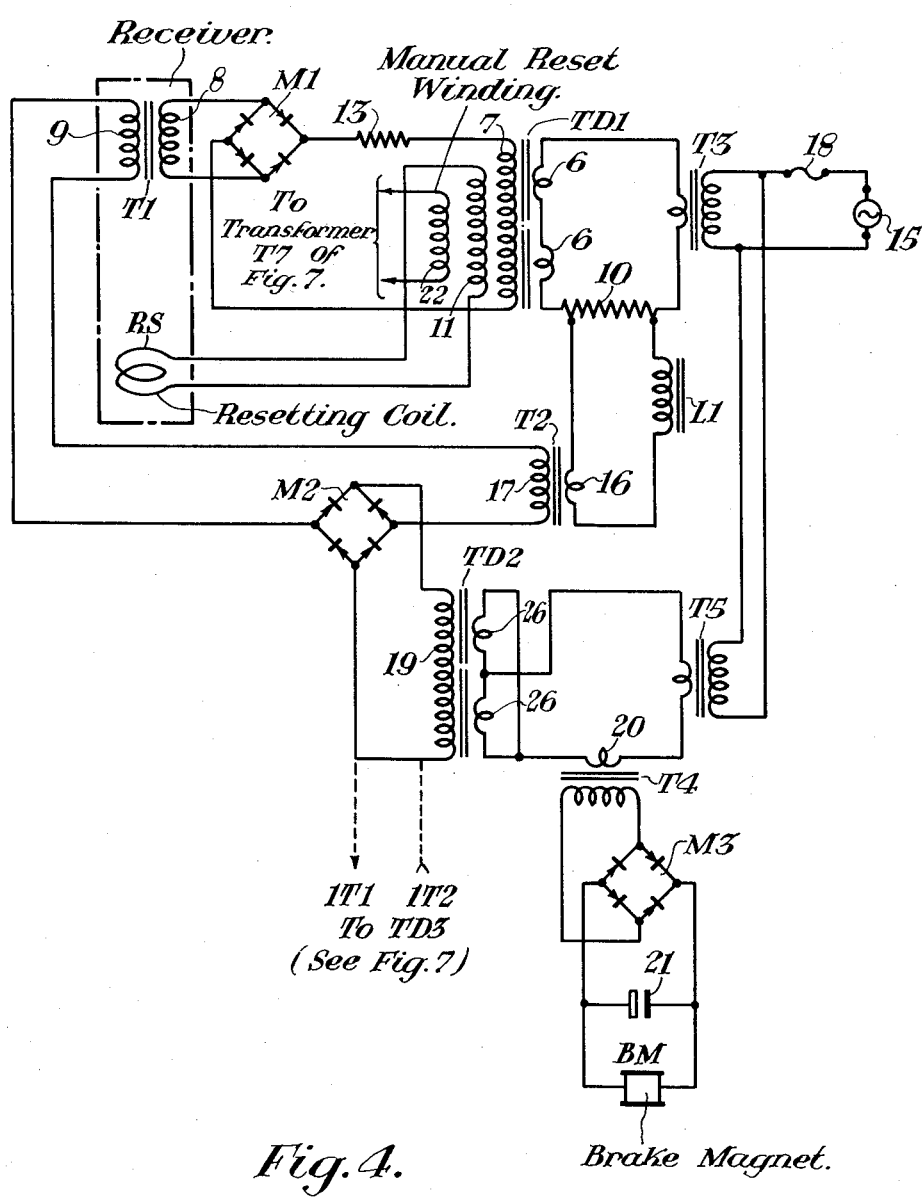
Fig. 4 is a schematic view of a modification of the circuit of Fig. 3 in which a reset coil and an amplifying stage is incorporated.

Referring now to Fig. 4, which shows the circuit of Fig. 3 in which a second stage of amplification has been added. In this circuit the output circuit of rectifier M2, instead of supplying power directly to the brake magnet BM, is connected to a control winding 19 of a second transductor TD2. The alternating current winding 26 of this transductor is connected to the alternating current supply source 15 through a transformer T5. The current flowing in the alternating current winding of transformer TD2 energizes a primary winding 20 of an output transformer T4 which, in turn, supplies energizing current to the brake magnet BM through a rectifier M3. A capacitor 21 is connected across the terminals of the brake magnet in order to provide a slow release feature for the latter so that it does not release during the time taken for the receiver to pass between the permanent magnet and the electromagnet, in order that its energization may be restored before it releases, providing the electromagnet is energized and the track signal is displaying a "clear" signal.

Also shown in Fig. 4 the arrangement includes a reset coil RS which is located in the receiver adjacent the saturable transformer T1 and mounted in such position that it passes over the track magnets immediately following the transformer T1. The reset coil is connected to control winding 11 of transductor TD1. The circuit including the reset coil is capable of detecting the direction of flux from the track magnets and supplying transductor TD1 with a reset pulse of current when the receiver passes through the flux field of the "north" pole of an energized electromagnet. The reset coil must be incapable of providing a spurious output which would prevent the tripping circuit from responding properly to the "south" flux as produced by the permanent magnet. These requirements are met by mounting the coil RS in the receiver with its axis vertical so that an electromotive force is generated in response to the movement of the receiver through the magnetic field.

Figure 5:
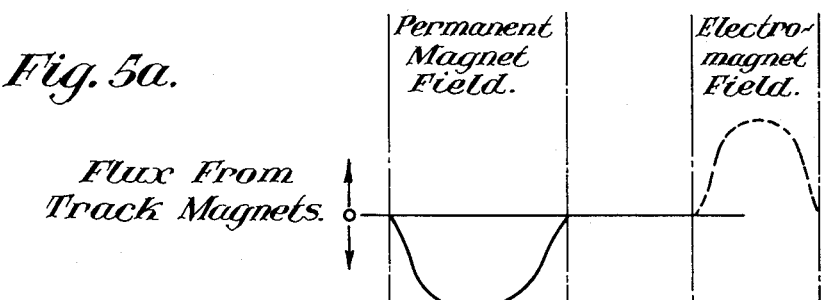
Fig. 5 is a diagrammatic view illustrating the flux distribution in certain portions of the apparatus in response to a train passing over the magnets in the trackway and of certain currents which are caused to flow as a result of the receiver passing through the flux fields of the magnets.

The action of the reset circuit is illustrated by the curves of Fig. 5. Referring now to Fig. 5, Fig. 5a illustrates the distribution of the magnetic flux produced by the track magnets, Fig. 5b illustrates the corresponding state of coupling of the transformer T1 as it passes through these flux fields, Fig. 5c illustrates the voltage induced in the reset coil while passing over the magnets, and Fig. 5d illustrates the output current supplied to the brake magnet BM. The broken lines in Fig. 5 represent the conditions resulting from the energization of the electromagnet when the signal is displaying a "clear" aspect.

When the receiver enters the field of the permanent magnet, the saturable transformer T1 is saturated by the magnetic flux produced by the magnet. This reduces the coupling of energy between the primary and secondary windings of transformer T1. Ignoring for the present the effect of the reset coil, the current in the alternating current winding 6 (see Fig. 4) of transductor TD1 will start to decrease, as the result of a decrease in the current flowing in the feedback winding 7 and at a rate depending upon the time constant of the circuit. By the time the receiver moves out of the field of the permanent magnet, the transductor will be switched to the "off" state. This of course assumes that the transductor was originally set to the "on" state. The sense in which the reset coil is connected is such that the electromotive force generated therein, as the flux from a permanent magnet is increasing due to the approaching of a permanent magnet, is in a direction such as to keep the transductor TD1 switched "on" so that initially the effect of the saturation of transformer T1 in interrupting the feedback current is nullified. As the flux decays due to the moving of the receiver from the permanent magnet, however, an electromotive force of the opposite polarity is generated within the reset coil and the transductor TD1 is rapidly switched to the "off" state.

The tripping circuit arrangement will thus respond to the permanent magnet equally well whether the reset coil is in the circuit or not, and it has been found in practice to operate satisfactorily even when the reset coil and winding 11 are short circuited, so that the inherent safety of the system is fully preserved.

It may also be observed that at any speed above a very moderate speed, the circuit will function on the output pulse of current from the reset coil alone, without the saturable transformer. The latter is necessary, however in order to achieve operation at speeds down to zero and to provide the essential fail safe characteristics.

As the receiver approaches a track electromagnet that is deenergized, due to the presence of a train in the next track section, the tripping circuit will remain in the "off" state until it is reset by a manual reset circuit soon to be explained. The manual reset circuit energizes control winding 22 of transductor TD1 (Fig. 4) with direct current of appropriate polarity to reset the tripping circuit to the "on" state. The brake magnet will be released after a slight time delay. On the other hand, if the electromagnet is energized due to the vacancy of the next track section, as the receiver enters the field of the electromagnet the staturable transformer is again saturated. This, of course, has no effect upon the tripping circuit, since the circuit is not energized at this time. At the same time an electromotive force is generated within the reset coil and is of such polarity as to switch "off" the already deenergized tripping circuit which, also, has no effect. However, upon leaving the flux field of the electromagnet, a pulse of current of the opposite polarity is induced in the reset coil which is of the correct polarity to restore the tripping circuit to its normal or "on" state. Since the saturable transformer becomes unsaturated before the electromotive force generated within the reset coil has ceased, the tripping circuit remains in the "on" state.

To insure rapid restoration of the feedback current it is necessary to avoid excessive inductance in the parts of the feedback circuit which carry direct current. This may be achieved by connecting the two halves of the alternating current windings of the transductor TD2 in parallel. If these windings are connected in series it is desirable to incorporate a short circuited control winding within the transductor to aid in the lowering of the inductance.

The circuits thus far described have the disadvantage that if a train should stop with its receiver directly over a permanent magnet in the trackway, the brakes will be automatically applied in accordance with the normal functioning of the system, and the train cannot be moved until the brakes are released by releasing the circuit manually. On the other hand, the circuit cannot be reset manually while the receiver is still over the permanent magnet, and consequently the train can be moved only by switching out the automatic train control system.

One method of avoiding this difficulty is to prevent the deenergization of the brake magnet until the receiver has moved away from the track magnet. This can be achieved by including a saturable choke in the receiver, as illustrated in Fig. 6.

Figure 6:
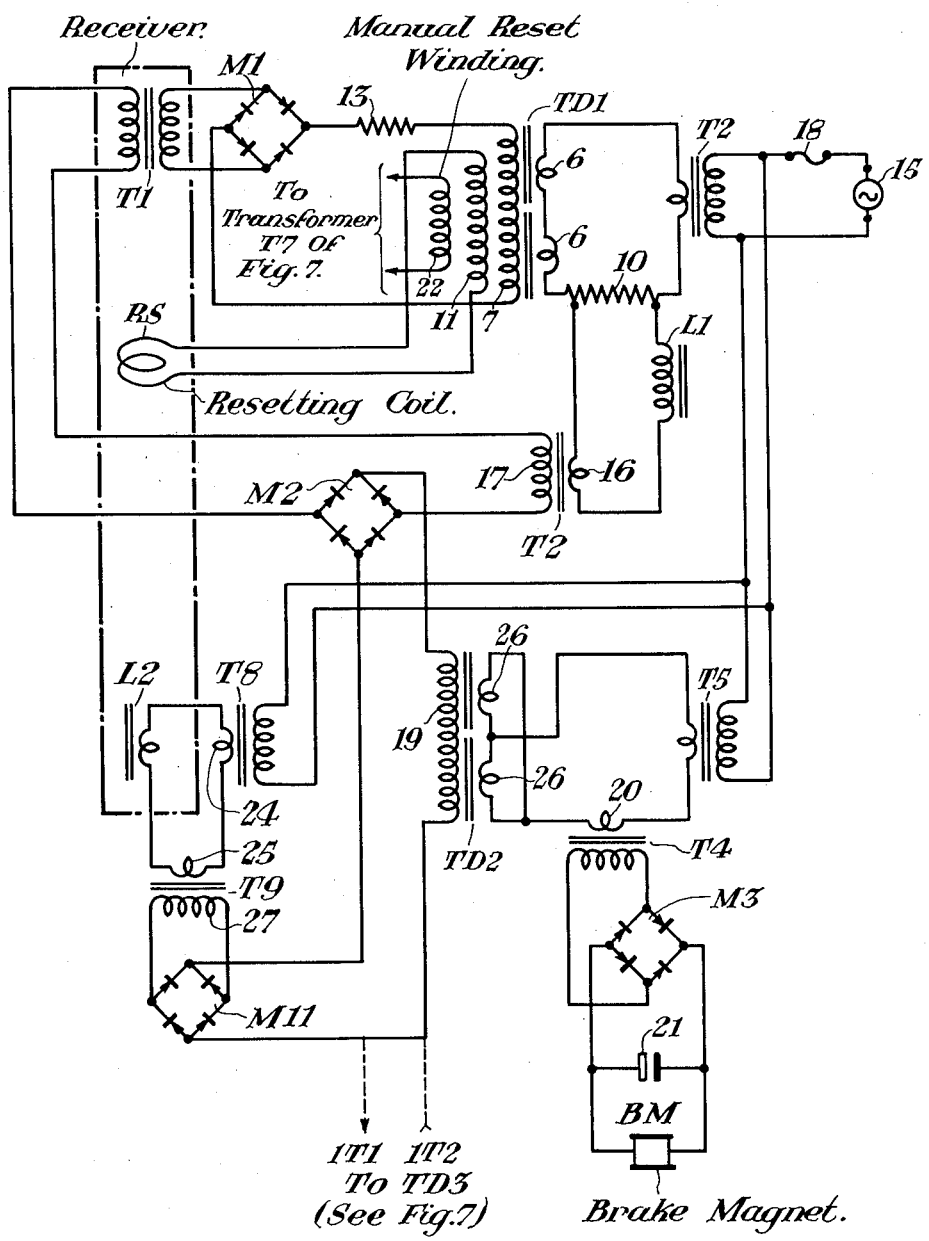
Fig. 6 is a schematic view of the circuit of Fig. 4 resigned to meet the possibility of a train coming to rest with its receiver directly over a permanent magnet in the trackway.

Referring to Fig. 6, L2 is a saturable choke which is incorporated within the receiver in addition to the saturable transformer and the reset coil of Fig. 4. If the security of the system is not to be impaired this choke must, of course, be protected against the possibility of short circuited turns, which protection may be provided by winding the coil with a few turns as in the case of the transductors TD1 and TD2 discussed heretofore. The choke is connected in series with a primary winding 24 of a low voltage supply transformer T8 and the primary winding 25 of an impedance matching transformer T9. A secondary winding 27 of transformer T9 is connected to a rectifier M11. The direct current circuit of rectifier M11 is connected in a series arrangement with the rectifier M2 and the control winding 19 of the brake magnet transductor TD2. With this arrangement, should the train come to rest with the receiver over the permanent magnet, the tripping circuit is switched "off," and there is negligible output current from rectifier M2. The choke L2, however, is saturated with the flux from the permanent track magnet and the output current from rectifier M11, which will be large under these conditions, maintains the energization of the control winding 19 of transductor TD2, and holds the brake magnet in an energized state. When the receiver is removed from the flux field of the track magnet, choke L2 becomes unsaturated and the output current from rectifier M11 is reduced to a low level. Accordingly, the brake magnet is then released. The circuit may be reset manually in the usual way, as described above.

Figure 7:
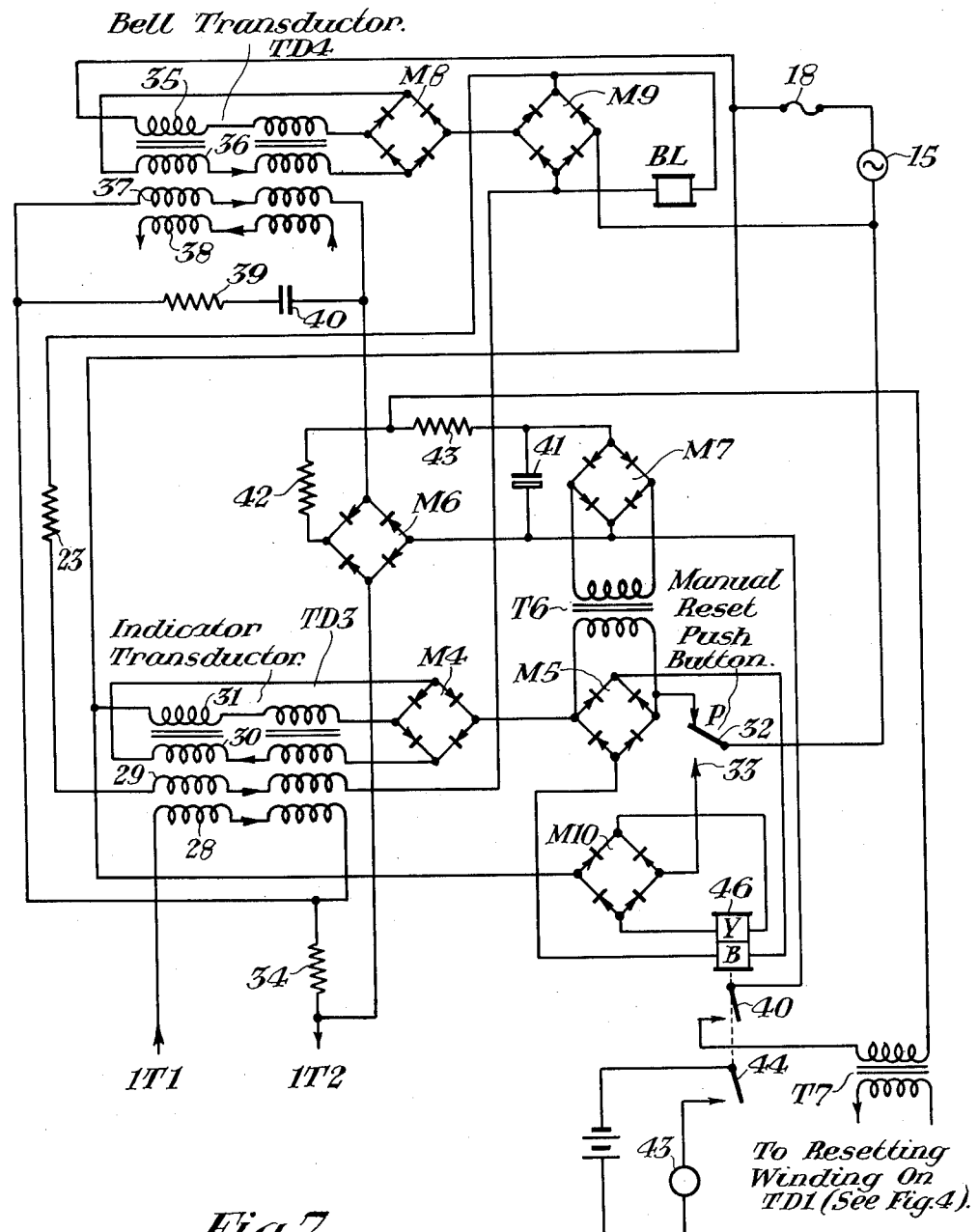
Fig. 7 shows a preferred form of the circuit for controlling visual and sound indicating means.

Fig. 7 illustrates a preferred circuit arrangement for the control of a visual indicator 43 and a bell BL carried by the train. It is required that the bell ring for a period of three or four seconds when the train approaches a signal displaying a "clear" aspect and that the visual indicator display a distinctive indication such as a yellow light, for example, when the train operator operates the reset switch following the initiation of a brake application when approaching a signal displaying a "caution" aspect. The indicator for displaying the signal is controlled by two operating windings Y and B of a relay 46 in such manner that an energization of winding Y causes the distinctive indication to be displayed and a subsequent energization of winding B cancels the display.

Winding B, accordingly, is required to be energized whenever the train passes over a track magnet, whether it be a permanent magnet or an energized electromagnet. Winding Y is required to be energized only when a manually operable reset push button P is operated, which operation brings about a deenergization of winding B. Thus, the operation of the reset push button by the operator in acknowledgement of a warning blast on a horn (not shown) when the brake magnet releases, causes the indicator to display the above mentioned distinctive indication to indicate to the operator that the last signal passed was displaying a "caution" aspect. This indication will be sustained until the train passes the next permanent magnet which will effect an energization of winding B to cancel the display.

The bell is required to ring only when the apparatus is reset automatically; that is, when the train passes over a permanent magnet and an energized electromagnet in succession. This condition occurs when a train is approaching a signal displaying a "clear" aspect. It must not ring when the apparatus is reset manually.

Figure 8:
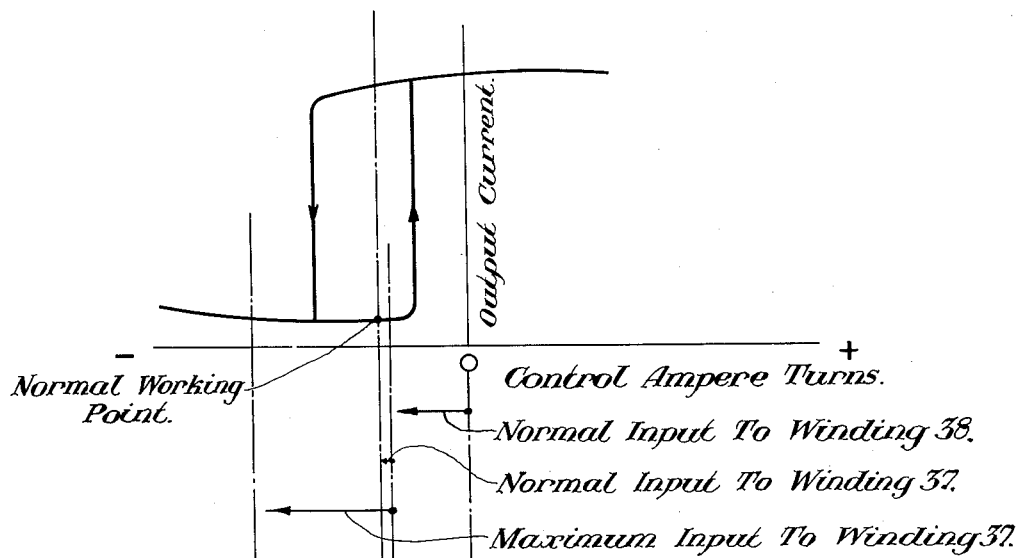
Figs. 8 and 9 show the magnetic characteristics of the two transductors shown in Fig. 7.

As shown in Fig. 7, the indicator winding BL is supplied with energizing current through an indicator transductor TD3. A control winding 28 of transductor TD3 is connected in series with a resistor 34 and a control winding of transductor TD2, as indicated by the broken lines IT1 and IT2 in Figs. 4 and 6. The energization of this control winding is thus dependent upon the feedback current of transductor TD1 and is of such polarity as to tend to maintain the output current of transductor TD3 at a minimum value. Transductor TD3 also has another control winding 29 connected in series with a resistor 23 to the direct current terminals of rectifier M9, through which the energizing current for the bell BL is supplied. The transductor is further supplied with a self-excitation or feedback winding 30 and an alternating current winding 31. The alternating current winding 31 is connected across the alternating current supply in series with rectifiers M4 and M5, the former energizing the self-excitation winding 30, the ampere turns of which oppose those of windings 29 and 30. This is indicated by means of arrows placed upon the windings to show the relative direction of the magnetomotive force produced by current flowing within the windings. The series circuit including rectifiers M4 and M5 also includes a normally closed contact 32 of a manual push button P which, when operated, opens this circuit and completes a circuit to a normally open contact 33. The opening of contact 32 disconnects the alternating current supply from transductor TD3 while the closing of contact 33 connects it across rectifier M10 to energize winding Y of the indicator relay 46. The feedback winding 30 of transductor TD3 is such as to provide sufficient self-excitation, over 100 percent, to produce a triggering action as represented by the characteristics shown in Fig. 8.

Figure 9:
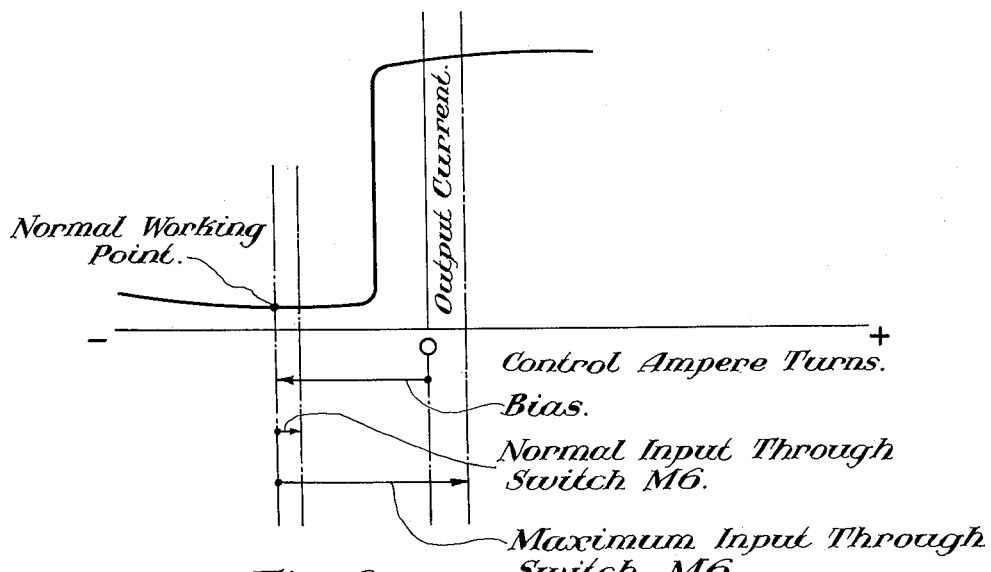

The bell transductor TD4 has an alternating current winding 35, a feedback winding or self-excitation winding 36 and two control windings 37 and 38. The alternating current winding 35 is connected to the alternating current supply 15 in series with rectifiers M8 and M9, of which the former supplies feedback current to winding 36 and the latter M9 supplies direct current for operating the bell BL. Winding 37 of transductor TD4 is connected across resistor 34 in series with rectifier M6, which is controlled by the output current of transductor TD3. A resistor 39 in series with a capacitor 40 is connected across winding 37 and the winding is so energized as to produce a magnetomotive force which aids the magnetomotive force produced by the feedback winding 36. Control winding 38 of transductor TD4 is connected to a direct current source, not shown, which supplies the transductor with a constant biasing current, the action of which opposes that of windings 36 and 37. Transductor TD4 is also provided with over 100 percent self-excitation but, in this case, as the load circuit is periodically interrupted by the driving contact of the bell, the transductor is switched "on" and "off" sharply at the same value of control ampere turns, as illustrated in Fig. 9, which shows the constant biasing ampere turns and opposing ampere turns of winding 37 when the rectifier switch M6 is "closed" (normal input) and when it is "open" (maximum input).

The rectifier switch M6 is similar in arrangement to a normal bridge connected rectifier and is of such nature that it is "switched on," that is rendered conductive across its alternating current terminals, when direct current is supplied, in a forward direction, through a resistor 42 of high resistance to its direct current terminals. As stated above, the switch M6 is controlled by the output of the indicator transductor TD3. Under normal conditions the output current of transductor TD3 is very small and the switch is thus substantially non-conducting or "open." The direct current required to "close" the rectifier switch M6 is derived from a transformer T6 the output of which is rectified by a rectifier M7 and filtered by a condenser 41.

The output terminals of rectifier M7 are connected in series with a current limiting resistor 43 and a normally open contact 40 of relay 46 to a primary winding of an impulse transformer T7. The secondary winding of the transformer is connected to the normal reset winding 11 of transductor TD1 (Fig. 4). The contact is closed when winding Y of the indicator control relay 46 is energized.

Under normal conditions, the indicator transductor TD3 is held in the bi-stable region of its characteristics by the output current of the tripping circuit which flows in its control winding 28 to keep it in the "off" state. The bell transductor is biased to the "off" state, by a considerable margin, with the constant current supplied to its control winding 38. Thus, there is normally only a small residual output current from both transductors. However, as the train approaches a signal displaying a "clear" aspect, there is, as described above, a short interruption of the current supplied to the control winding 19 of transductor TD2 (Fig. 4) and, in turn, the current in control winding 28 of the indicator transductor TD3. This triggers transductor TD3 to the "on" state which increases the output current of transductor TD3 and which brings about an energization of the winding B of the indicator relay 46. The increased output current from transductor TD3 also charges the large capacitor 41 through the step-up transformer T6 and rectifier M7 to render the rectifier switch M6 conductive across its alternating current terminals by virtue of the current through resistor 42. A conducting path is thereby established between resistor 34 and control winding 37 of the bell transductor, but since there is substantially no current in winding 28 of transductor TD3 and no appreciable voltage is being developed across resistor 34, the bell transductor remains "off." When the current in the tripping circuit is restored, however, control winding 37 of transductor TD4 is energized in a direction to switch "on" TD4, and the bell BL rings. Transductor TD3 is not switched "off" directly by the restoration of the current, but remains "on" until switched "off" by the current in control winding 29 from transductor TD4. The latter transductor has a high gain and therefore a correspondingly long time constant, and since this control circuit is of low impedance (resistor 34 and rectifier M6) an appreciable delay (a fraction of a second) occurs before its output rises sufficiently to switch transductor TD3 "off."

This delay provides a period in which condenser 41 can be charged to nearly its maximum voltage through the impedance of its supply circuit, even at the highest train speed. The values of capacitor 41 and resistor 42 are chosen to give a long time constant (several seconds). After transductor TD3 is switched "off," rectifier switch M6 remains conductive until the discharge current through resistor 42 decreases to some predetermined value at which time transductor TD4 becomes switched "off" which, in turn, causes the bell to stop ringing and all conditions are fully restored to normal.

When the train approaches a signal displaying a "caution" aspect the initial stage of operation of the apparatus is the same as that just described. That is, the current in winding 28 of transductor TD3 is reduced to substantially zero and this transductor is accordingly triggered "on" which energizes winding B of the indicator relay 46 and renders rectifiers switch M6 conductive. In this case, however, the electromagnet in the trackway is not energized and the current in winding 28 of transductor TD3 is not restored automatically. The conditions of the apparatus must be reset manually by operating the reset push button P to open its contact 32 and close its contact 33, thus breaking the energizing circuit for winding B and closing that for winding Y of relay 46. The energization of winding Y closes contact 40 which closes a circuit through the primary winding of impulse transformer T7 whereby capacitor 41 can discharge. This action passes a corresponding current pulse through the reset winding 22 of transductor TD1 (Fig. 4) which renders that transductor conductive and the apparatus is restored to normal with the exception of the indicator which continues to indicate the fact that the last signal was displaying a "caution" aspect. This condition exists until winding B is again energized upon the passing of a permanent magnet associated with the next signal. It will be noted that the indicator contact 40, while closed at this time, effectively prevents the energization of rectifier switch M6 by providing a discharge path of lower impedance for capacitor 41 so that the bell transductor TD4 is not rendered conductive and the bell does not ring.

It will also be noted that the opening of contact 32 of the reset push button P disconnects the alternating current supply from the transductor TD3, thus insuring that it is switched "off" and held in that state by the re-energization of its winding 28 when the current in the tripping circuit is restored.

The impulse transformer T7 is provided as a safety precaution against the possibility of a fault effectively short circuiting the alternating current winding of transductor TD3, which with the indicator contact closed, would otherwise prevent transductor TD1 from tripping.

In the above description of the circuit shown in Fig. 7 it is explained that the time delay which occurs between the passing of the train over an energized electromagnet and the ringing of the bell, when a train approaches the signal displaying a "clear" aspect, is brought about by the use of a bell transductor having a high gain and a long time constant which allows adequate time for capacitor 41 to become charged. This delay, if desired, may be elminated by the use of a circuit shown in Fig. 10 in place of that of Fig. 7. In this circuit a transductor with derivative feedback is used to obtain a suitably long time constant with a reasonably small capacitor.

Figure 10:
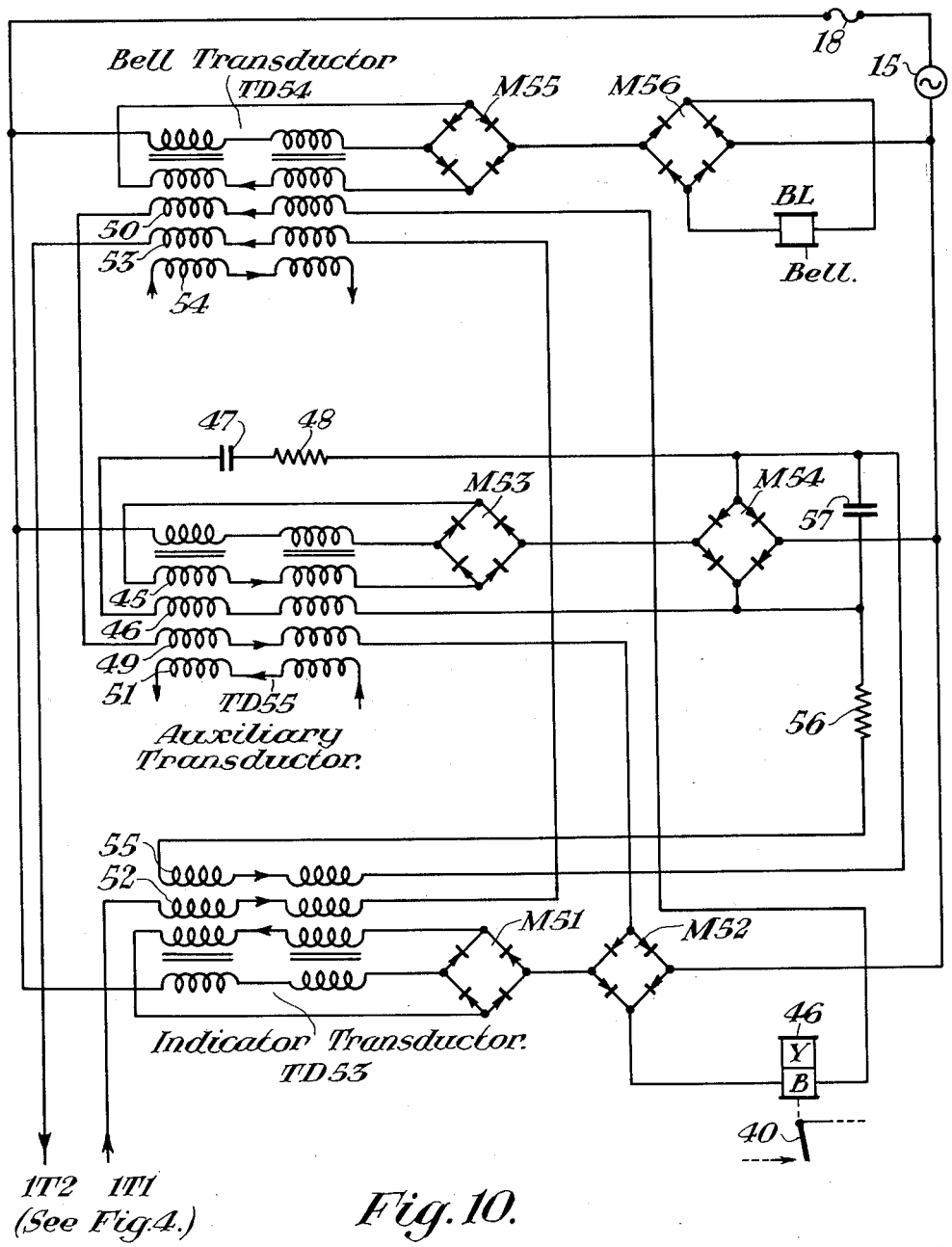
Fig. 10 is a diagrammatic view of an alternate form of an indicating circuit.

Referring now to Fig. 10 an indicator transductor TD53 and a bell transductor TD54 are similar to transductor TD3 and TD4 of Fig. 7, except that transductor TD54 has an additional control winding. The circuit of Fig. 10 in addition, includes an auxiliary transductor TD55. Transductor TD55 has 100 percent self-excitation, giving a steep asymmetrical characteristic and, in addition to the self-excitation winding 45, is provided wth three control windings, one of which 46, is connected to the rectified output of transductor TD55 through a capacitor 47 and a resistor 48 in such way that the response of the transductor is slowed down to give an effective time constant of several seconds.

Control winding 49 of this transductor is connected in series with winding 50 of the bell transductor TD54 and operating winding B of the indicator relay 46 to the direct current terminals of rectifier M52, which rectifies the output current of the indicator transductor TD53. Control winding 51 of transductor TD55 is constantly energized by a biasing current from a source of energy, not shown, which normally renders the transductor non-conducting or "off." Control winding 52 of transductor TD53 and 53 of transductor TD54 are connected in series with the tripping circuit through leads IT1 and IT2 (Fig. 4). Control winding 54 of the bell transductor TD54 is constantly energized from a direct current biasing source (not shown) and functions in a similar manner to winding 38 of the bell transductor TD4 of Fig. 7. Control winding 55 of the indicator transductor TD53 is energized, through a resistor 56, by the output current of the auxiliary transductor TD55 which is rectified by rectifier M54. Also connected across the direct current terminals of rectifier M54 is a capacitor 57 in parallel with a derivative feedback circuit comprising resistor 48, capacitor 47 and winding 46 of transductor TD55.

Normally, the indicator transductor TD53 is held in the "off" state by a direct current derived from the tripping circuit through leads IT1 and IT2 flowing in its control winding 52. This same current flows in winding 53 of bell transductor TD54 which tends to render that transductor conductive but the biasing current in winding 54 holds it in the "off" condition at this time. The auxiliary transductor TD55 is also held in its "off" condition by the biasing current in its winding 51. When the train now passes over a permanent magnet in the trackway transductor TD1 (Fig. 4) is triggered "off" and the current in winding 52 of transductor TD53 and winding 53 of transductor TD54 ceases, with the result that transductor TD53 is triggered to the conductive or "on" condition so that it energizes winding B of the indicator relay 46. At the same time, transductor TD53 energizes control winding 50 of transductor TD54 and winding 49 of transductor TD55. The output current of the transductor TD55 then begins to rise at a rate depending upon the derivative feedback through resistor 48 and capacitor 47 and there is accordingly a growth of current in winding 55 of transductor TD53 in a direction tending to render that transductor non-conductive, that is to switch it to the "off" state. The output current of transductor TD53 flows, at this time, in control winding 50 of the bell transductor TD54 in a direction such to produce a magnetomotive force which opposes that of the biasing winding 55 but, in the absence of current derived from the tripping circuit and flowing in winding 53, it is sufficient to overcome the bias produced by winding 55. However, when the train passes over the electromagnet in the trackway, if the signal is displaying a "clear" aspect and the electromagnet is energized, the current in the tripping circuit is restored and the combined effect of the currents flowing in windings 50 and 53 of the bell transductor TD54 is then sufficient to overcome the effect of the biasing winding and to render that transductor conductive so that the bell BL rings for a period of several seconds until the current in winding 55 of transductor TD53 has obtained sufficient magnitude to restore that transductor to the "off" condition, whereupon transductor TD55 is also switched "off" and normal conditions are again restored.

If, however, the signal displays a "caution" aspect, the electromagnet is not energized and the current derived from the tripping circuit is not automatically restored. The output of the auxiliary transductor TD55 then continues to rise until the current in winding 55 of transductor TD53 is sufficient to switch the transductor "off," whereupon the cessation of current in winding 49 of transductor TD55 causes the switching "off" of that transductor. In the absence, however, of current in winding 52 of transductor TD53, that transductor will again become switched "on" as soon as the output of transductor TD55 has decreased sufficiently to permit this. This sequence of events is then repeated periodically to form a continuous oscillation until the circuit is reset manually by means not shown in Fig. 10 but which are similar to those shown in Fig. 7 except that a separate source is required for the resetting pulse.

It is therefore seen that our invention provides train carried apparatus for an automatic inductive train control system that is inherently safe and free from failure due to wear of moving parts. It is also clear that the apparatus operates in a fail safe fashion so that the failure of any component does not result in an unsafe control of the train, upon which the apparatus is mounted. Furthermore all inherent safety features of the apparatus are fully preserved in order to provide a train control system as completely reliable as possible.

While we have herein shown and described several forms of vehicle carried apparatus for an automatic inductive train control system, it is to be understood that various changes and modifications may be made therein within the scope of the appended claims without departing from the spirit and scope of our invention.

Having thus described our invention, what we claim is:

1. Vehicle carried apparatus for an intermittent inductive train control system comprising a saturable reactor provided with an alternating current winding and a feed-back winding, a source of alternating current energy, a load, means connecting the output from said source, said alternating current winding and said load in series, saturable means having input and output terminals, means connecting said input terminals across said load, a brake magnet connected in series with said input terminals, means connecting said output terminals across said feedback winding, said saturable means coupling a first or second magnitude of energy from said load to said feed-back winding according as said saturable means is unsaturated or saturated, said reactor controlling first or second levels of current flow through said load according as said saturable means couples first or second magnitudes of energy to said feed-back winding, and said brake magnet being energized or deenergized according as the current flow through said load is at said first or second levels, respectively.

2. Vehicle carried apparatus for an intermittent inductive train control system comprising a saturable reactor provided with an alternating current winding and a feed-back winding, a source of alternating current energy, a load, means connecting said source, said load and said alternating current winding in series, saturable means having input and output terminals, means connecting said input terminals across said load, a brake magnet connected in series with said input terminals, means connecting said output terminals across said feed-back winding, said saturable means coupling maximum or minimum energy from said load to said feed-back winding according as said saturable means is unsaturated or saturated, said reactor controlling a maximum or minimum current flow through said load according as said saturable means couples maximum or minimum energy to said feed-back winding, and said brake magnet being energized or deenergized according as the current flow through said load is maximum or minimum.

3. Vehicle carried apparatus for an intermittent inductive train control system in which a railway track is divided into track sections, in which each section is provided with a permanent magnet and an electromagnet, and having means for energizing said electromagnet when the associated track section is occupied; said apparatus comprising, in combination, a saturable reactor provided with an alternating current winding and a feed-back winding, a source of alternating current energy, a load, means connecting said source, said load and said alternating current winding in series, saturable means having input and output terminals, means connecting said input terminals across said load, a brake magnet connected in series with said input terminals, means connecting said output terminals across said feed-back winding, said saturable means coupling maximum or minimum energy from said load to said feed-back winding according as said saturable means is unsaturated or saturated, said alternating current winding controlling a maximum or minimum current flow through said load according as said saturable means couples maximum or minimum energy to said feed-back winding, and said brake magnet being energized or deenergized according as the current flow through said load is maximum or minimum.

4. Vehicle carried apparatus for an intermittent inductive train control system comprising a saturable reactor provided with an alternating current winding and a feed-back winding, a source of alternating current energy, a load, means connecting said source, said load and said alternating current winding in series, a saturable transformer having primary and secondary windings, said primary winding being connected across said load and said secondary winding being connected across said feed-back winding, first and second rectifying means connected in series with said primary and second windings respectively, the saturation of said transformer arranged to be controlled by external means, said saturable transformer when unsaturated coupling sufficient energy from said load to the feed-back winding of said saturable reactor to cause said alternating current windings to effect a maximum current flow through said load, and said transformer when saturated coupling a minimum of energy from said load to said feed-back winding to cause said alternating current windings to effect a minimum current flow through said load, and a brake magnet connected to said first rectifying means, said brake magnet being energized or deenergized according as the current flow through said load is maximum or minimum 5. Vehicle carried apparatus for an intermittent inductive train control system comprising a saturable reactor provided with an alternating current winding and a feed-back winding, a source of alternating current energy, a load, means connecting said load, said alternating current winding and said source in series, a saturable transformer having primary and secondary windings, said primary winding being connected across said load, the saturation of said transformer arranged to be controlled by external means, first and second bridge rectifiers each having a pair of alternating current terminals and a pair of direct current terminals, a saturable choke, the alternating current terminals of said first bridge rectifier being connected in series with said primary winding and said choke, said alternating current terminals of said second bridge rectifier being connected across said secondary winding of said transformer, the direct current terminals of said second bridge rectifier being connected across said feedback winding, said transformer when unsaturated coupling sufficient energy from said load to said feedback winding to cause said alternating current winding to effect a maximum current flow through said load, said transformer when saturated coupling minimum energy from said load to said feedback winding to cause said alternating current winding to effect only a minimum current flow through said load, and a brake magnet connected across the direct current terminals of said first bridge rectifier, said brake magnet being energized or deenergized respectively according as the current flow through said load is maximum or minimum.

6. Vehicle carried apparatus for an intermittent inductive train controlled system in which a railway track is divided into track sections and in which each section is provided with a permanent magnet and an electromagnet, said electromagnet being energized or deenergized according as its associated track section is unoccupied or occupied respectively, said apparatus comprising, in combination, a saturable reactor provided with an alternating current winding, a feed-back winding and a control winding; a source of alternating current energy; a load; means connecting said source, said alternating current winding and said load in series; saturable means having input and output terminals, means connecting said input terminals across said load, means connecting said output terminals across said feed-back winding, and a brake magnet connected in series with the input terminals of said saturable means, said saturable means when unsaturated coupling maximum energy and when saturated coupling minimum energy from said load to said feedback winding, said alternating current windings of said reactor effecting maximum or minimum current flow through said load according as said saturable means couples maximum or minimum energy to said feed-back winding, said brake magnet being energized or deenergized according as the current flow through said load is maximum or minimum, said saturable means upon passing said permanent magnet being saturated thereby coupling a minimum of energy from said load to said feedback winding to effect a minimum current flow through said load to cause deenergization of said brake magnet, said electromagnet when energized inducing an electromotive force in said control winding of said reactor to reset said reactor and cause said alternating current winding to effect a maximum current flow through said load.

7. Train carried apparatus for an intermittent inductive train control system comprising a first saturable reactor provided with an alternating current winding, a feed-back winding and a control winding; a source of alternating current energy; a load; means connecting the output of said source, said alternating current winding and said load in series, saturable means having input and output terminals, means connecting said input terminals across said load, means connecting said output terminals across said feed-back winding; rectifying means; a brake magnet connected in series with the input terminals of said saturable means, said saturable means coupling maximum or minimum energy from said load to said feedback winding according as it is unsaturated or saturated, respectively, said alternating current windings effecting maximum or minimum current through said load according as said saturable means couples maximum or minimum energy to said feed-back winding, and said brake magnet being energized or deenergized according as the current through said load is maximum or minimum; a second saturable reactor provided with an alternating current winding and a control winding, means connecting the output of said source across said alternating current winding of said second reactor; means connecting said control winding of said second reactor across said rectifying means thereby to control the current flow through said alternating current winding in said second reactor; a brake magnet; and means inductively coupling a part of the current flowing through said alternating current winding of said second reactor to energize said brake magnet when the current flow through said load is maximum.

8. Vehicle carried apparatus for an intermittent inductive train control system in which a railway track is divided into track sections and in which each section is provided with a permanent magnet and an electromagnet, said electromagnet being energized or deenergized according as its associated track section is unoccupied or occupied respectively; said apparatus comprising, in combination, a first saturable reactor provided with an alternating current winding and a feed-back winding, a source of alternating current energy, a load, means connecting said alternating current winding said source and said load in series, said saturable means having input and output terminals, means connecting said input terminals across said load, rectifying means connected in series with said input terminals, means connecting said output terminals across said feed-back winding, said saturable means coupling maximum or minimum energy from said load to said feed-back winding according as it is unsaturated or saturated, said reactor effecting maximum or minimum current flow through said load according as said saturable means couples maximum or minimum energy to said feed-back winding, a second saturable reactor provided with an alternating current winding and a control winding, means connecting the output of said source across said alternating current winding of said second reactor, means connecting said control winding of said second reactor across said rectifying means, a brake magnet, means inductively coupling a part of the current flowing in said alternating current winding of said second reactor to energize said brake magnet when the current flow through said load is maximum, said saturable means being saturated upon passing a permanent magnet to cause said first reactor to effect a minimum current flow through said load to deenergize said brake magnet, means for resetting said first reactor upon passing an energized electromagnet to cause said first reactor to effect a maximum current through said load to energize said brake magnet, and indicator means arranged to be energized when said vehicle carried apparatus passes over a permanent magnet and an energized electromagnet in succession.

9. Vehicle carried apparatus for an intermittent inductive train control system in which a railway track is divided into track sections and in which each section is provided with a permanent magnet and an electromagnet, said electromagnet being energized or deenergized according as its associated track section is unoccupied or occupied respectively, said apparatus comprising, in combination, a first saturable reactor provided with an alternating current winding and a feed-back winding, a source of alternating current energy, a load, means connecting the output of said source, said alternating current winding and said load in series, saturable means having input and output terminals, rectifying means connected in series with said input terminals, means connecting said input terminals across said load, means connecting said output terminals across said feed-back winding, said saturable means coupling maximum or minimum energy from said load to said feed-back winding according as it is unsaturated or saturated, said reactor effecting maximum or minimum current flow through said load according as said saturable means couples maximum or minimum energy to said feed-back winding, a second saturable reactor provided with an alternating current winding and a control winding, means connecting said control winding of said second reactor across said rectifying means, means connecting the output of said source across said alternating current winding of said second reactor, a brake magnet, means inductively coupling a part of the current flowing in said alternating current winding of said second reactor to energize said brake magnet, said saturable means being saturated upon passing a permanent magnet, and reset coil means for resetting said first reactor to cause said first reactor to effect a maximum current through said load upon passing an energized electromagnet whereby the current through said load is changed from a maximum to minimum when said saturable means passes said permanent magnet and the current through said load is changed from minimum to maximum when said reset coil passes an energized electromagnet.

10. Vehicle carried apparatus for an intermittent inductive train control system in which a railway track is divided into track sections and in which each section is provided with a permanent magnet and an electromagnet, said electromagnet being energized or deenergized according as its associated track section is unoccupied or occupied respectively, said apparatus comprising, in combination, a first saturable reactor provided with an alternating current winding, a feed-back winding, a control winding and a reset winding; a source of alternating current energy; a load; means connecting the output of said source, said alternating current winding and said load in series, saturable means having input and output terminals, means connecting said input terminals across said load, means connecting said output terminals across said feed-back winding; rectifying means connected in series with said input terminals, said saturable means coupling maximum or minimum energy from said load to said feed-back winding according as it is unsaturated or saturated, said alternating current windings of said reactor having maximum or minimum current flow therethrough according as said saturable means couples maximum or minimum energy to said feed-back winding, a reset coil connected in series with said control winding; manually controlled means arranged for energizing said reset winding to provide means for controlling the current flow through through said alternating current windings; a second saturable reactor provided with an alternating current winding and a control winding; means connecting said control winding of said second reactor across said rectifying means, means connecting the output of said source across said alternating current winding of said second reactor; a brake magnet; and means including a transformer inductively coupling a part of the current flowing through said alternating current winding of said second reactor to said brake magnet to energize said brake magnet when the current through the alternating current winding of said first reactor is maximum, the current through said load being changed from maximum to minimum when said saturable means passes said permanent magnet to deenergize said brake magnet and apply the vehicle brakes unless said reset coil passes an energized electromagnet in a relatively short time thereafter.

11. Vehicle carried apparatus for an intermittent train control system in which a railway track is divided into track sections and in which each section is provided with a permanent magnet and an electromagnet, said electromagnet being energized when the associated track section is unoccupied and being deenergized when said associated track section is occupied, said apparatus comprising, in combination, a first saturable reactor provided with an alternating current winding, a feed-back winding, a control winding and a reset winding; a source of alternating current energy; a load; means connecting the output of said source, said alternating current winding and said load in series; saturable means having input and output terminals; rectifying means connected in series with said input terminals; means connecting said input terminals across said load; means connecting said output terminals across said feed-back winding; a reset coil connected in series with said control winding; manually controlled means arranged for energizing said reset winding for controlling the current flow through said alternating current windings; a saturable choke; means for connecting the output of said source to said saturable choke; a second saturable reactor provided with an alternating current winding and a control winding; means connecting said rectifying means across the control winding of said second reactor; a brake magnet; and means for inductively coupling a part of the current flowing in said alternating current winding of said second reactor, to energize said brake magnet when the current flowing in said load is maximum, said brake magnet being deenergized when the current flow in said load is minimum.

References Cited in the file of this patent

UNITED STATES PATENTS

| Re. 19,129 | Lee | Apr. 3, 1934 |
| --- | --- | --- |
| 2,278,151 | Runaldee | Mar. 31, 1942 |
| 2,287,755 | Barth | June 23, 1942 |
| 2,512,317 | Edwards | June 20, 1950 |
| 2,548,176 | Semm | Apr. 10, 1951 |
| 2,765,436 | Dornhoeffer | Oct. 2, 1956 |